Figure 1:
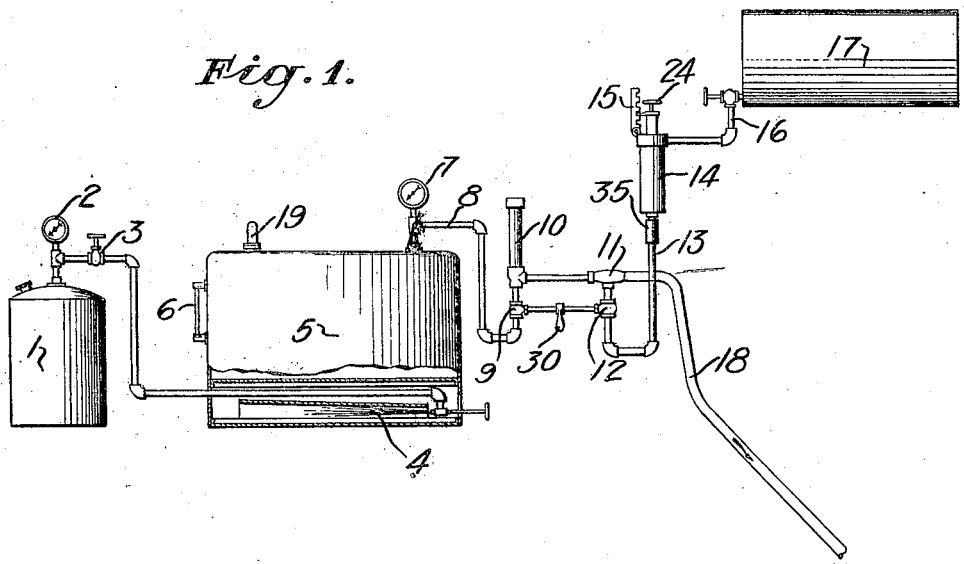

Aug. 31, 1926.

F. W. BRAUN 1,597,759

PROCESS OF FUMIGATION

Filed June 8, 1922

INVENTOR:
FREDERICK W. BRAUN,
BY
Graham + Lewis
ATTORNEYS.

Patented Aug. 31, 1926.

1,597,759

UNITED STATES PATENT OFFICE.

FREDERICK W. BRAUN, OF LOS ANGELES, CALIFORNIA, ASSIGNOR TO CALIFORNIA CYANIDE COMPANY, INCORPORATED, A CORPORATION OF DELAWARE.

PROCESS OF FUMIGATION.

Application filed June 8, 1922. Serial No. 566,838.

My invention relates to the art of fumigation, and it is particularly applicable to the fumigation of orchards.

It is common practice in fruit producing countries and particularly in countries producing citrus fruit to provide for the fumigation of the trees at stated intervals. This fumigation is ordinarily accomplished in citrus orchards by enclosing the tree in a portable cover, or tent, thus providing a space in and around the tree which is to be filled with the fumigating agent. The fumigating agent is then introduced into this fumigating space and it should be so introduced that it penetrates into all portions of this space if it is to be efficacious. In such fumigation, various fumigating agents may be used, the fumigating agent generally preferred in the citrus countries being hydrocyanic acid, or some other lethal agent in the form of a gas or vapor.

The method now in general use of introducing hydrocyanic acid into the fumigating space is to introduce it in the form of a spray, that is, in the form of a liquid in a highly atomized condition. When hydrocyanic acid is introduced into a fumigating space in this manner, a certain amount of vaporization of the hydrocyanic acid takes place, but unless this space is at a suitable temperature and unless the trees and other objects within the space are moderately warm the hydrocyanic acid will condense upon the surface of the tent, the limbs and foliage of the trees and upon the surface of the ground.

Since in the fumigation of orchards a definite dosage has been found to be efficient and it is common practice for economical reasons to supply to the fumigating space an exact dosage, it is evident that this uncertain factor of condensation tends to prevent an efficient use of the fumigating agent due to the uncertainty as to the amount of condensation. This condensation and cooling due to the vaporization of the fumigating agent also tends to produce a stratification of the fumigating vapors in the space to be fumigated with a further loss in efficiency.

It is an object of my invention to provide a process of and apparatus for fumigating by the use of hydrocyanic acid or a similar fumigating agent which will obviate the defects of the present method just described. This I accomplish by introducing into the space to be fumigated the vapor of a substance hereinafter called a stabilizer which has a higher boiling point than the fumigating agent, this vapor also preferably being introduced above its boiling point and above the average temperature prevailing in the fumigating space.

In practice when hydrocyanic acid is used, I prefer to use water vapor as a stabilizer, water not only having a higher boiling point than hydrocyanic acid but also having a boiling point in excess of the temperature found in and around the fruit trees which it is sought to fumigate. The water vapor also has a high latent heat of vaporization and is preferably introduced in intimate mixture with the vapor of the fumigating agent. Upon contacting with the surfaces inside the fumigating space, the water vapor tends to condense at temperatures considerably above those at which the hydrocyanic acid tends to condense, during its condensation giving up its latent heat of vaporization which tends to maintain the temperature inside the space to be fumigated and thus to very materially retard the condensation of the fumigating agent in this space. Since the water vapor and the fumigating agent are intimately mixed, the latent heat of vaporization of the water vapor is released at any point at which condensation would tend to take place and thus prevents condensation of the fumigating agent at that point.

Figure 2:
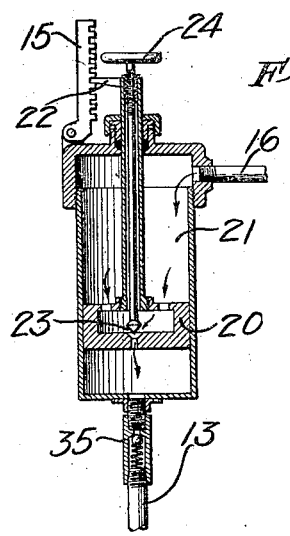

While my process may be practiced with many forms of apparatus, I have devised a special form of apparatus which is quite efficient in carrying on the process, this form of apparatus being illustrated in the annexed drawing in which Fig. 1 is a diagrammatic elevation of an apparatus suited to carry on my process, and Fig. 2 is an enlarged cross section of the measuring device.

The apparatus, as illustrated, consists of a gasoline or other fuel tank 1 which is provided with a pressure gauge 2 and which supplies fuel to a gasoline burner 4 through a feed pipe having a valve 3. The burner 4 is placed below a boiler 5 having a water gauge 6 and a steam pressure gauge 7. The boiler may also be provided with a safety valve 19 if desired. The boiler furnishes steam to a steam line 8 which communicates with a steam valve 9 to which a compression chamber 10 is connected. The compression chamber 10 is also connected into a standard steam injector 11 to which the bottom of a measuring device 14 is also connected through a pipe 13 and a valve 12. The valves 9 and 12 are preferably connected together so that they may be opened and closed simultaneously by a suitable operating lever 30. The measuring device 14 is constructed as shown in Fig. 2, having a piston 20 which may be adjusted up and down in a cylinder 21, the amount of this adjustment being determined by a finger 22 engaging a rack 15. A valve 23 which may be closed by means of a hand wheel 24 is provided in the piston. The space above the piston 20 in the cylinder 21 is connected to a hydrocyanic acid container 17 through piping 16. The mixture of steam and hydrocyanic acid are delivered from the injector 11 through a pipe 18 to the space to be fumigated.

The method of operation is as follows:

Steam being raised in the boiler 5 by the oil burner 4, the pressure of this steam may be read on the gauge 7 and maintained at any desired point by a suitable manipulation of the fuel valve 3 or by any other convenient means. The valves 9 and 12 being closed, the valve 23 is opened and a definite dose of hydrocyanic acid is allowed to flow through the pipe 16 and through the valve 23 into the lower part of the measuring device 14, the amount of this dose being determined by the height of the piston 20 which may be regulated for any desired dose by means of the rack 15. As soon as the space in the lower part of the measuring device 14 is filled, the valve 23 is closed by means of the hand wheel 24. The valves 9 and 12 are then opened, admitting steam into the chamber 10 and simultaneously into the injector and drawing the hydrocyanic acid from the measuring device 14 through the pipe 13, the spring loaded valve 35 and the valve 12. The steam and hydrocyanic acid are intimately mixed in the injector, the mixture of steam and hydrocyanic acid being forced under pressure through the pipe 18 into the space to be fumigated. As soon as the hydrocyanic acid is entirely exhausted from the measuring device 14, valve 35 closes automatically and the valves 9 and 12 are closed. The compression chamber 10 contains steam and blows sufficient steam through the line 18 to clear it of any hydrocyanic acid vapors which may be contained therein. By a suitable adjustment of the injector 11, the minimum proportion of steam to hydrocyanic acid can be quite accurately regulated. I have found that a considerable excess of steam is not injurious.

By introducing steam or water vapor into the fumigating space, I provide a carrier and stabilizer for the hydrocyanic acid and also provide a source of heat supply which tends to hold the hydrocyanic acid in vapor form and prevent premature condensation thereof.

I claim as my invention:

1. A process of fumigating comprising: introducing into the space to be fumigated a fumigating agent comprising hydrocyanic acid; and a vapor having a higher boiling point than said fumigating agent.

2. A process of fumigating comprising: introducing into the space to be fumigated a fumigating agent comprising hydrocyanic acid, and a vapor having a higher boiling point than said fumigating agent, said vapor also having a higher boiling point than the average temperature of said space.

3. A process of fumigating comprising: introducing into the space to be fumigated a fumigating agent comprising hydrocyanic acid; and a vapor having a high latent heat of vaporization, and a higher boiling point than said fumigating agent.

4. A process of fumigating comprising: introducing into the space to be fumigated a fumigating agent comprising hydrocyanic acid; and a vapor having a high latent heat of vaporization, and a higher boiling point than said fumigating agent, said vapor also having a higher boiling point than the average temperature of said space.

5. A process of fumigating comprising: forming a mixture of a fumigating agent, comprising hydrocyanic acid, and a carrier vapor having a higher boiling point than said fumigating agent; and thereafter forcing said mixture into the space to be fumigated.

6. A process of fumigating comprising: blowing steam through hydrocyanic acid and delivering the mixture to the space to be fumigated.

In testimony whereof, I have hereunto set my hand at Los Angeles, California, this 29th day of May, 1922.

FREDERICK W. BRAUN.